United States Patent [19]

Sasaki et al.

[11] Patent Number: 5,210,478

[45] Date of Patent: May 11, 1993

[54] METHOD OF CORRECTING MACHINE POSITION CHANGE

[75] Inventors: Takao Sasaki, Hachioji; Kentaro Fujibayashi, Musashino; Makoto Haga, Minamitsuru, all of Japan

[73] Assignee: Fanuc Ltd, Minamitsuru, Japan

[21] Appl. No.: 720,847

[22] PCT Filed: Nov. 9, 1990

[86] PCT No.: PCT/JP90/01461
§ 371 Date: Jul. 15, 1991
§ 102(e) Date: Jul. 15, 1991

[87] PCT Pub. No.: WO91/08528
PCT Pub. Date: Jun. 13, 1991

[30] Foreign Application Priority Data

Nov. 27, 1989 [JP] Japan .................. 1-307098

[51] Int. Cl.$^5$ ........................ G05B 23/275
[52] U.S. Cl. ................. 318/632; 318/561; 318/569; 318/601; 364/175; 364/474.35
[58] Field of Search ............... 318/560-561, 318/563, 569-570, 599, 600, 611, 615-618, 632, 633, 39, 45, 648, 449, 603; 364/474.11, 474.16, 474.17, 172-175, 474.28, 474.3, 474.35

[56] References Cited

U.S. PATENT DOCUMENTS

| | | | |
|---|---|---|---|
| 4,502,108 | 2/1985 | Nozawa et al. | 318/632 X |
| 4,514,813 | 4/1985 | Nozawa et al. | 318/570 X |
| 4,659,265 | 4/1987 | Kishi et al. | 318/572 X |

Primary Examiner—William M. Shoop, Jr.
Assistant Examiner—David Martin
Attorney, Agent, or Firm—Staas & Halsey

[57] ABSTRACT

A method of correcting a change of position of a machine tool having at least two control axes. A position change check simulator (14) obtains a ratio (R2) of amounts of movement of respective axes (Xe1, Ye1) obtained from output values of position detectors (8X, 8Y) for detecting a position of the machine tool, and further, obtains a ratio (R1) of predicted amounts of movement of the respective axes obtained from a machine position predicted on the basis of distribution pulses (Xp5, Yp5) of the respective axes, assuming that a servo system has a first order lag. A position correcting means (12) outputs a correction pulse (Xc1, Yc1) so that the ratio (R2) of actual amounts of movement becomes equal to the ratio (R1) of the predicted amounts of movement. This correction pulse (Xc1, Yc1) is added to command pulses (Xp1, Yp1), and accordingly, an abrupt machining error occurring at the beginning and just before the end of machining, and during the machining at corners of a machined article, can be eliminated.

4 Claims, 6 Drawing Sheets

METHOD OF CORRECTING MACHINE POSITION CHANGE

TECHNICAL FIELD

The present invention relates to a method of correcting a change of position of a machine by which a change of position of a machine tool controlled by a numerical control device is corrected, and more particularly, to a method of correcting a change of position of a machine by which a change of position of a machine tool having control axes with different rigidities is corrected.

BACKGROUND ART

In a numerical control device (CNC), a workpiece is machined to a desired contour by moving a tool at a commanded speed along a commanded path by a machining program.

To obtain a satisfactorily machined surface corresponding faithfully to a command by a machine tool using such a numerical control device, it is essential to use a servo mechanism with a quick response that enables it to follow rapid changes in the command, and having a high stability by which a stable movement without vibration is ensured.

A speed detector and a position detector of a servomotor in the servo mechanism detect speed and position and a desired control is carried out by a feedback of the information obtained to a control circuit. The servo mechanism can be classified into three types; a semi-closed loop, a closed loop and a hybrid servo method, according to the method used to detect a position.

The best method among the above three servo mechanism methods is adopted for each machine tool, according to the accuracy and rigidity, etc. required by the machine tool.

Nevertheless, the mechanical rigidities of the axes of general machine tools are different from each other, and these differences are particularly noticeable among large-sized machine tools. Therefore, when a cutting is carried out by a machine tool having more than two axes, form errors are generated in the vicinity of a starting point and an end point of machining or at corners, and thus the accuracy of the cutting work becomes poor.

Figure 6:
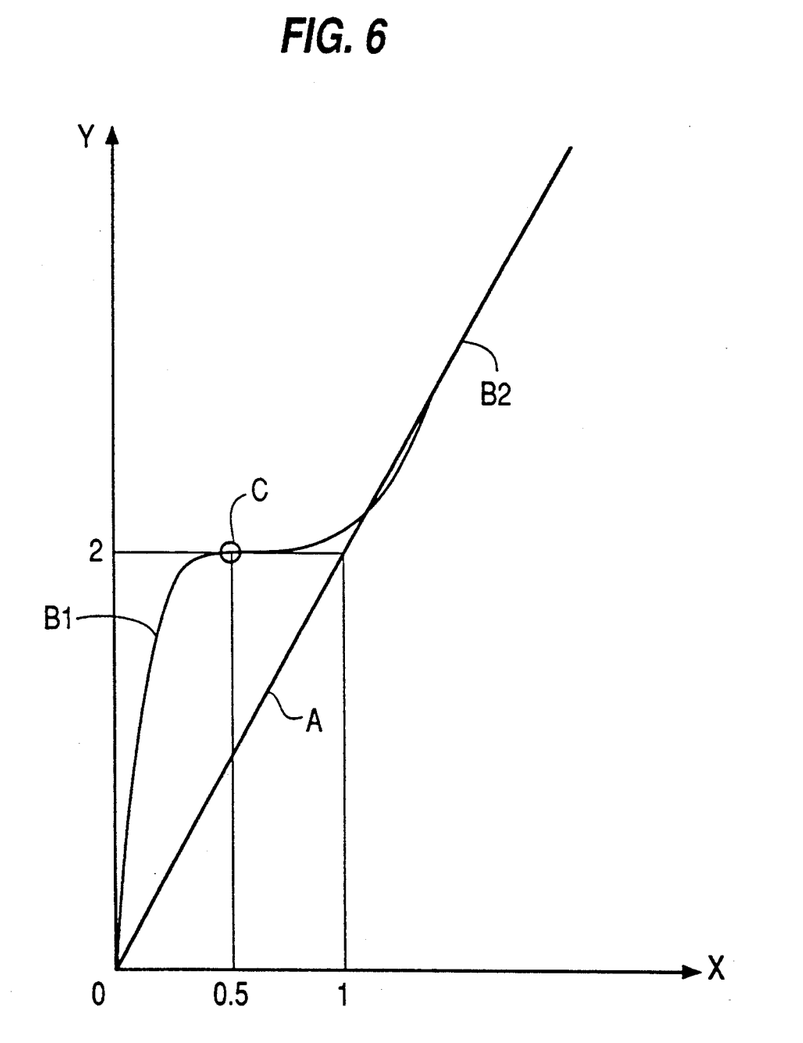
FIG. 6 is a diagram showing a cutting with two axes according to a conventional method.

FIG. 6 shows a state of cutting with two axes according to a conventional method. In this Fig, it is assumed that machine rigidity is relatively weak at the X-axis and relatively strong at the Y-axis, and further, that the X-axis is moved by 0.100 mm and the Y-axis by 0.200 mm by these control axes.

If the machine rigidities of the X-axis and the Y-axis are the same, a cutting in a straight line, without error, as shown by the straight line A, is usually obtained, but if the machine rigidity of the X-axis is weak, the movement of the X-axis is too little, as shown by the curve B1, and even though the ratio of distribution pulses of the X-axis to the Y-axis is 1:2, the actual ratio of the machine positions becomes 1:4, as shown by the point C, which results in a form error.

DISCLOSURE OF THE INVENTION

The present invention has been made in view of the aforesaid drawbacks, and an object of the present invention is to provide a method of correcting a change of position of a machine, by which an abrupt machining error occurring due to difference in machine rigidities between locations at which control axes are provided can be minimized.

To achieve the above object, in accordance with the present invention, there is provided a method of correcting a change of position of a machine, in which a change of position of a machine tool having at least two control axes is corrected, characterized in that a correction pulse is added to a distribution pulse of respective axes so that a ratio of amounts of movement of the respective axes of the machine tool obtained from output values of position detectors used for detecting a position of the machine tool becomes equal to a ratio of predicted amounts of movement of the respective axes obtained from a predicted machine position based on the distribution pulses of the respective axes, assuming that a servo system has a first order lag.

The actual amounts of movement of the respective axes are derived from the output values of the position detectors used for detecting a position of the machine tool. Therefore, when the machine rigidity is the same at all axes, the ratio of the predicted amounts of movement of the respective axes derived from the predicted machine position based on the distribution pulses of the respective axes, assuming that the servo system has a first order lag, is usually equal to the ratio of the actual amounts of movement of the machine tool. Nevertheless, since errors occur due to differences in the machine rigidities, the ratio of the actual amounts of movement does not become equal to the ratio of the predicted amounts of movement of the respective axes. Accordingly, a correction pulse is added to the distribution pulse of the respective axes, which is made an output pulse, so that the ratio of the actual amounts of movement of the respective axes of the machine tool becomes equal to the ratio of the predicted amounts of movement of the respective axes, and the output pulse controls the respective axes, whereby an abrupt machining error occurring in the vicinity of the starting point and the end point of the machining, or at corners, can be eliminated.

Also, as the machine position can be indirectly determined by using values of error registers of the respective axes or feedback pulses, instead of the position detectors, the ratio of the amounts of movement of the machine tool can be obtained on that basis.

BEST MODE OF CARRYING OUT THE INVENTION

An embodiment of the present invention will hereinafter described with reference to the drawings.

Figure 1:
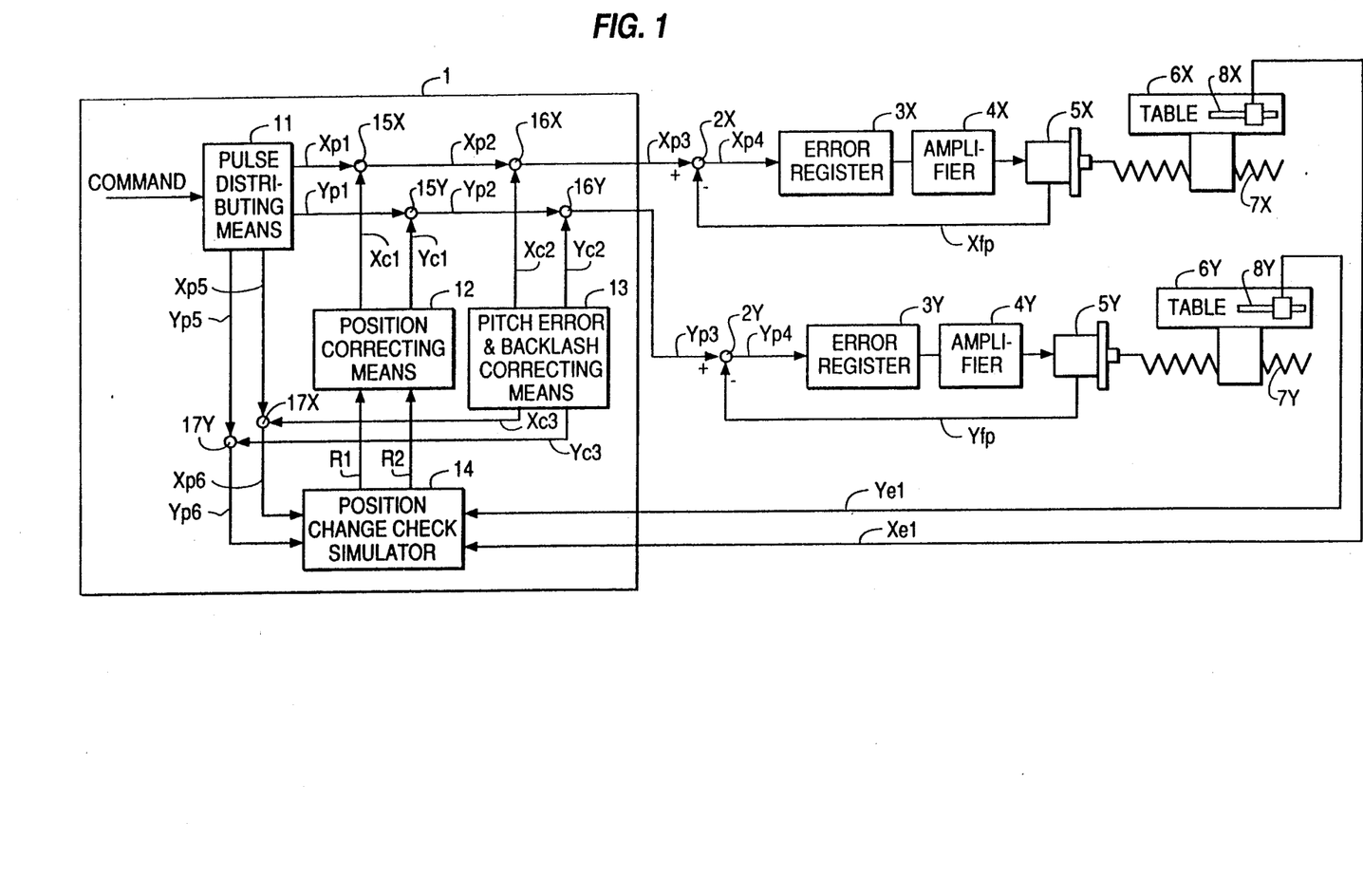
FIG. 1 is a block diagram showing an embodiment of a method of correcting a change of position of a machine according to the present invention.

FIG. 1 is a block diagram showing an embodiment of a method of correcting a change of position of a machine, according to the present invention, wherein a numerical control unit 1 is provided with a pulse distributing means 11, a position correcting means 12, a pitch error and backlash correcting means 13, and a position change check simulator 14.

The pulse distributing means 11 controls the servomotors 5X and 5Y and receives a command corresponding to a machining program from a processor (not shown), carries out an interpolative operation after an acceleration/deceleration control, and outputs command pulses Xp1 and Yp1, for controlling the servomotors 5X and 5Y of the X-axis and the Y-axis, to operators 15X and 15Y. Also, the pulse distributing means 11 outputs command pulses Xp5 and Yp5, which are the same as the command pulses Xp1 and Yp1, to operators 17X and 17Y.

The pitch error and backlash corresting means 13 outputs correction pulses Xc2 and Yc2, for correcting pitch error and backlash, to operators 16X and 16Y, and outputs the same correction pulses Xc3 and Yc3 to the operators 17X and 17Y.

The operators 17X and 17Y add the correction pulses Xc3 and Yc3 to the command pulses Xp5 and Yp5 and output the combined pulses to the position change check simulator 14, as distribution pulses Xp6 and Yp6 for the X-axis and the Y-axis.

The position change check simulator 14 contains a first order lag in one stage, based on the assumption that the servo system has a first order lag, and predicts a machine position based on the distribution pulses Xp6 and Yp6 to which the pitch error and backlash correction pulses Xc3 and Yc3 have been added. Further, amounts of movement of the X- and the Y-axes are calculated from the predicted machine position, and a ratio R1 of the predicted amounts of movement is obtained and output to the position correcting means 12. Furthermore, the position check simulator 14 receives position signals Xe1 and Ye1 from position detectors 8X and 8Y installed at tables 6X and 6Y of the machine tool, calculates a ratio R2 of the actual amounts of movement of the machine tool from the position signals Xe1 and Ye1, and outputs the result as signals R1 and R2 to the position correcting means 12.

The position correcting means 12 receives the signals R1 and R2 from the position check simulator 14, and accordingly, supplies correction pulses Xe1 or Ye1 to the operators 15X and 15Y, whereby both ratios are made the same.

The operators 15X and 15Y add the correction pulses Xc1 and Yc1 from the position correcting means 12 to the command pulses Xp1 and Yp1 and output the combined pulses to the operators 16X and 16Y, as command pulses Xp2 and Yp2.

The operators 16X and 16Y output command pulses Xp3 and Yp3, obtained by adding the correction pulses Xc2 and Yc2 from the pitch error and backlash correcting means 13 to the command pulses Xp2 and Yp2, to operators 2X and 2Y.

The operators 2X and 2Y output values acquired by subtracting position feedback pulses Xfp and Yfp from the servomotors 5X and 5Y from the command pulses Xp3 and Yp3, i.e., pulses Xp4 and Yp4 corresponding to error amounts, to error registers 3X and 3Y.

The error registers 3X and 3Y store numerical values of the pulses Xp4 and Yp4 corresponding to the error amounts and output corresponding voltages to amplifiers 4X and 4Y.

The amplifiers 4X and 4Y amplify the voltages output from the error registers 3X and 3Y, to thereby drive the servomotors 5X and 5Y.

The servomotors 5X and 5Y contain pulse coders, and feed back the outputs of these pulse coders, as the position feedback pulses Xfp and Yfp, to the operators 2X and 2Y.

Ball screws 7X and 7Y integrally fitted to the tables are coupled with the servomotors 5X and 5Y, and thus the X-axis and Y-axis tables 6X and 6Y are moved by driving the servomotors 5X and 5Y. The position detector 8X and 8Y for detecting the machine position are provided at the tables 6X and 6Y, and usually comprise an inductosin, magnetic scale, optical scale, moire fringe counter, or laser measuring device, etc.

In this Figure, the tables 6X and 6Y are shown separately, but in practice are constituted as one table. Also, in this Figure, a spindle control circuit for controlling a spindle, a spindle amplifier, and a spindle motor, etc. have been omitted.

Figure 2:
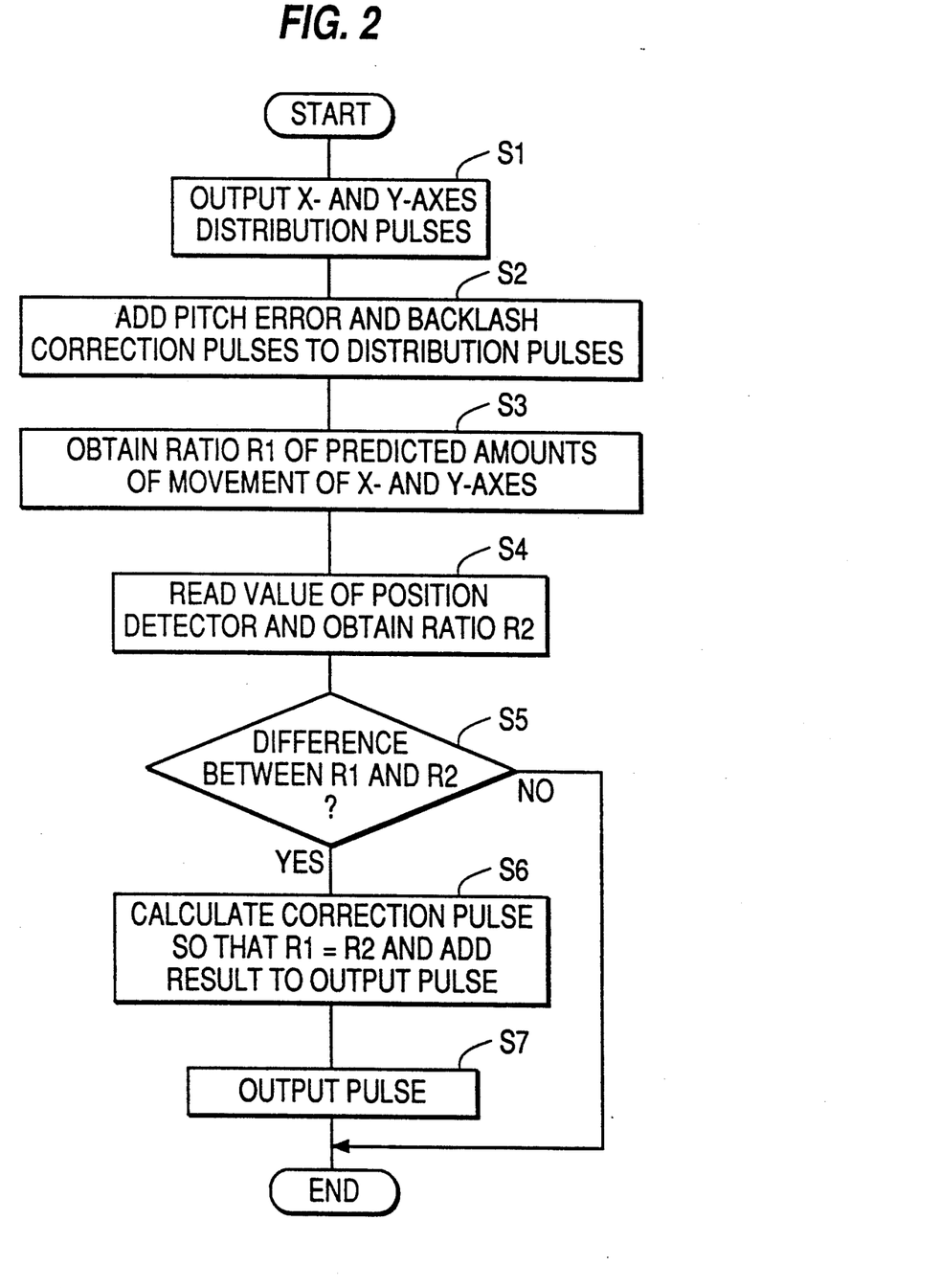
FIG. 2 is a flow chart showing a method of correcting a change of position of a machine according to the embodiment in FIG. 1.
Figure 3:
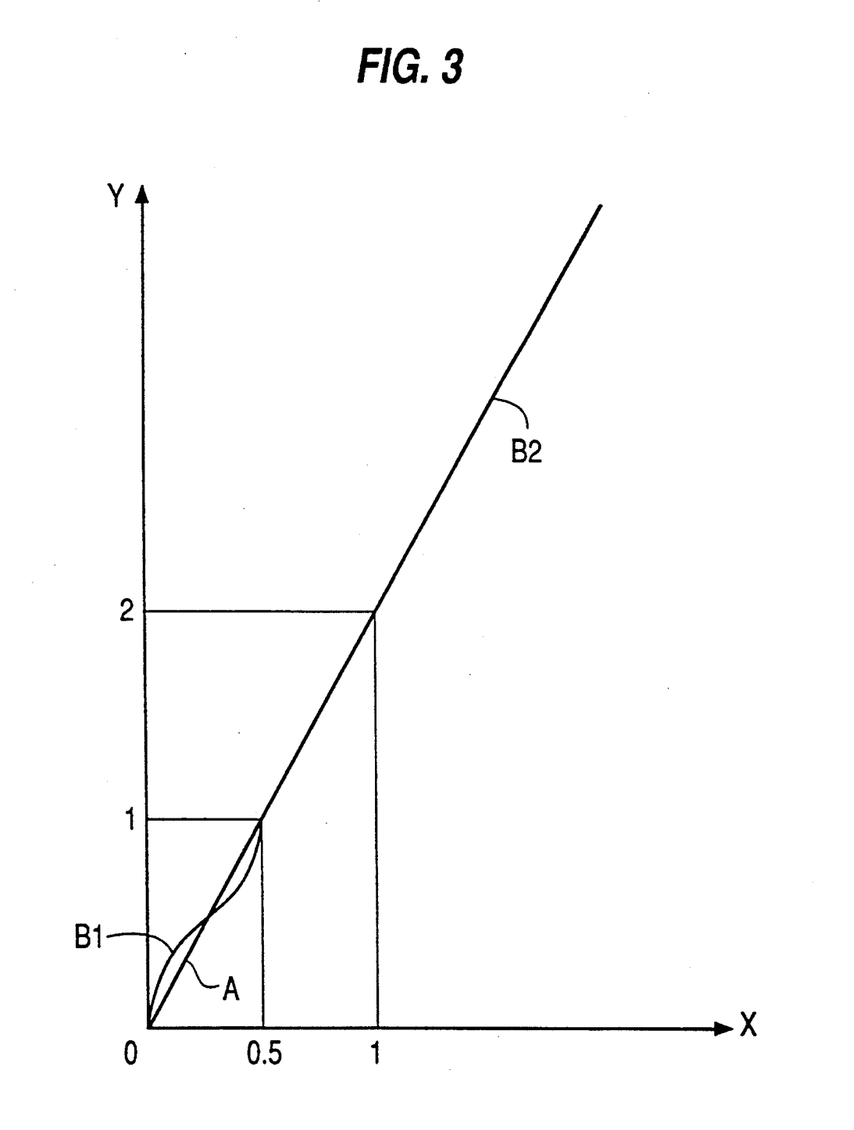
FIG. 3 is a diagram showing a cutting interpolation with two axes, according to the present embodiment.

The operation according to the embodiment of FIG. 1 will be explained with reference to the drawings. FIG. 2 shows a flow chart of a method of correcting a change of position of a machine according to the embodiment shown in FIG. 1. FIG. 3 diagrammatically shows a cutting interpolation with two axes according to the present embodiment, which corresponds to FIG. 6. In FIG. 2, numerical values following the letter S show the number of the Step.

[S1] The pulse distributing means 11 outputs the distribution pulses according to the commands, i.e., the command pulses Xp1 and Yp1, and Xp5 and Yp5 of the X-axis and the Y-axis.

[S2] The correction pulses Xc2 and Yc2, and Xc3 and Yc3 for correcting pitch errors and backlash are added to the distribution pulses Xp2 and Yp2, and Xp5 and Yp5, respectively.

[S3] The position change check simulator 14 predicts the machine position based on the distribution pulses Xp6 and Yp6 of the X-axis and the Y-axis, and derives the ratio R1 of the predicted amounts of movement of the X-axis and the Y-axis from the predicted machine position.

[S4] The position change check simulator 14 receives the machine position from each of the position detectors 8X and 8Y and obtains the ratio R2 of the actual amounts of movement of the machine.

Although, in the present embodiment, the position change check simulator 14 obtains the ratio R2 of the actual amounts of movement of the machine, the ratio R2 may be derived at the position correcting means 12 by inputting the position signals Xe1 and Ye1 from the position detectors 8X and 8Y directly to the position correcting means

[S5] The position correcting means 12 compares the ratio R1 with the ratio R2 and determines whether there is a difference between the two. If a difference exists, the routine goes to S6, and if not, the routine is finished.

[S6] When it is determined that a difference exists between the ratio R1 and the ratio R2, the position correcting means 12 calculates the correction pulse Xc1 or Yc1, so that the ratio R1 becomes equal to the ratio R2, and adds the correction pulse Xc1 or Yc1 to the command pulse Xp1 or Yp1.

[S7] The numerical control unit 1 outputs the command pulses Xp3 and Yp3 obtained by adding the correction pulses Xc1 and Yc1 and the pitch error and backlash correction pulses Xc2 and Yc2 to the command pulses Xp1 and Yp1, as distribution pulses.

The above processing routine corrects a form error as shown in FIG. 6 from the curve B1 to the straight line B2 as shown in FIG. 3, in which the error is eliminated as much as possible, and thus the cutting in a straight line with a minimum of errors becomes possible. Namely, in the present embodiment, the processing is repeated in such a manner that the machine position is obtained, based on the position signals Xe1 and Ye1, from the position detectors 8X and 8Y, the actual amounts of movement of the machine are monitored, and the correction pulse Xc1 or Yc1 is added to the output pulse so that the ratio R2 becomes equal to the ratio R1 (1:2) when the ratio R2 of the amounts of movement of the X-axis to those of the Y-axis is not equal to the ratio R1 (1:2). Accordingly, an erroneous rapid form change as shown in FIG. 6 is eliminated and the cutting work as in FIG. 3 can be carried out.

Figure 4:
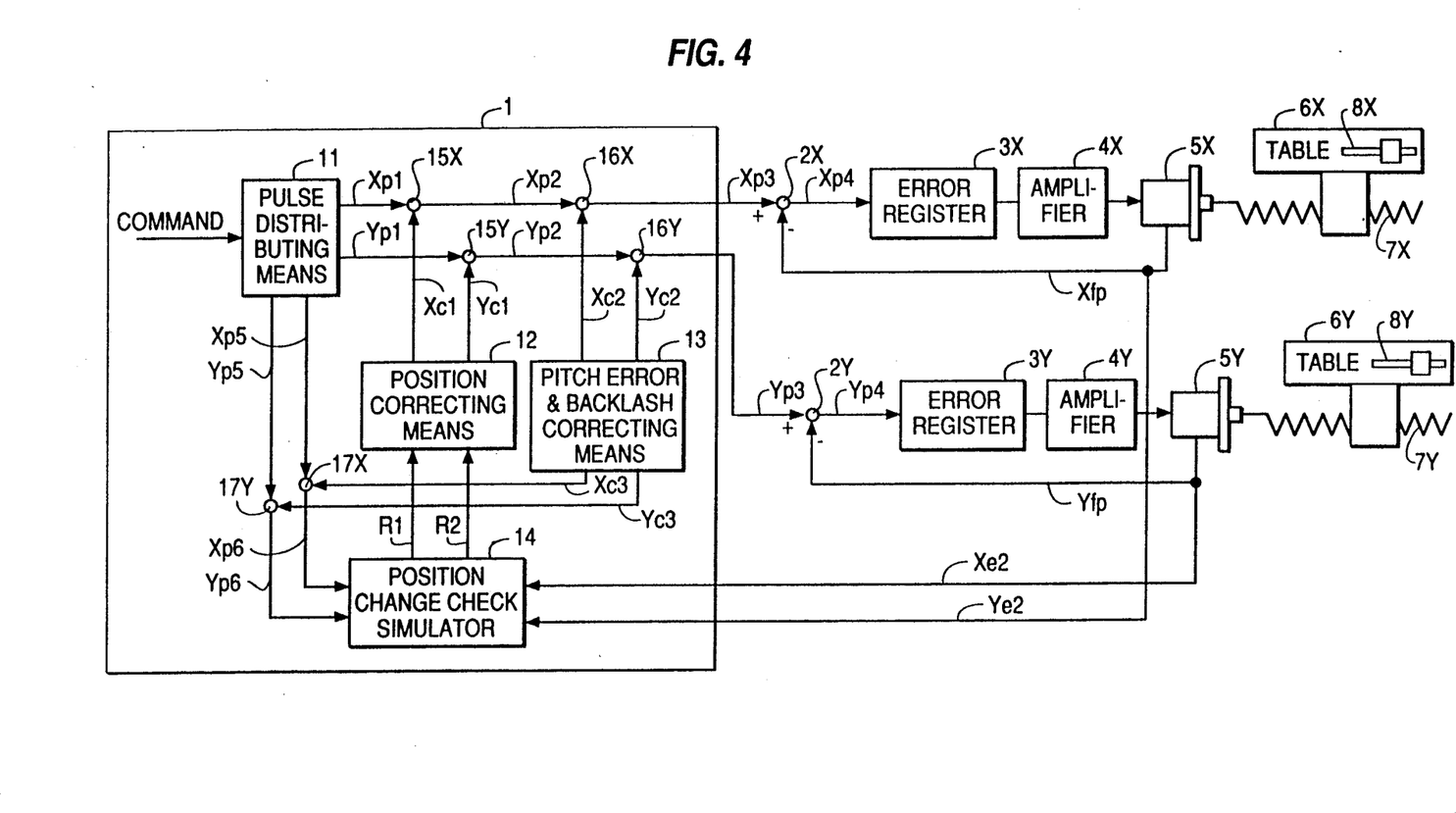
FIG. 4 and FIG. 5 are diagrams showing a method of correcting a change of position of a machine according to another embodiment of the present invention.

FIG. 4 is a block diagram showing a method of correcting a change of position of a machine according to another embodiment of the present invention. The present embodiment is different from that of FIG. 1 in that feedback pulses Xe2 and Ye2 from the servomotors 5X and 5Y, instead of the position signals Xe1 and Ye1, are input to the position change check simulator 14, and that the position change check simulator 14 obtains the machine position based on these feedback pulses Xe2 and Ye2 and calculates the ratio R2. This method is more advantageous than calculating the machine position from the position signals Xe1 and Ye1 output from the position detectors 8X and 8Y, since expensive machine position detectors need not be provided, but it is not as accurate.

Figure 5:
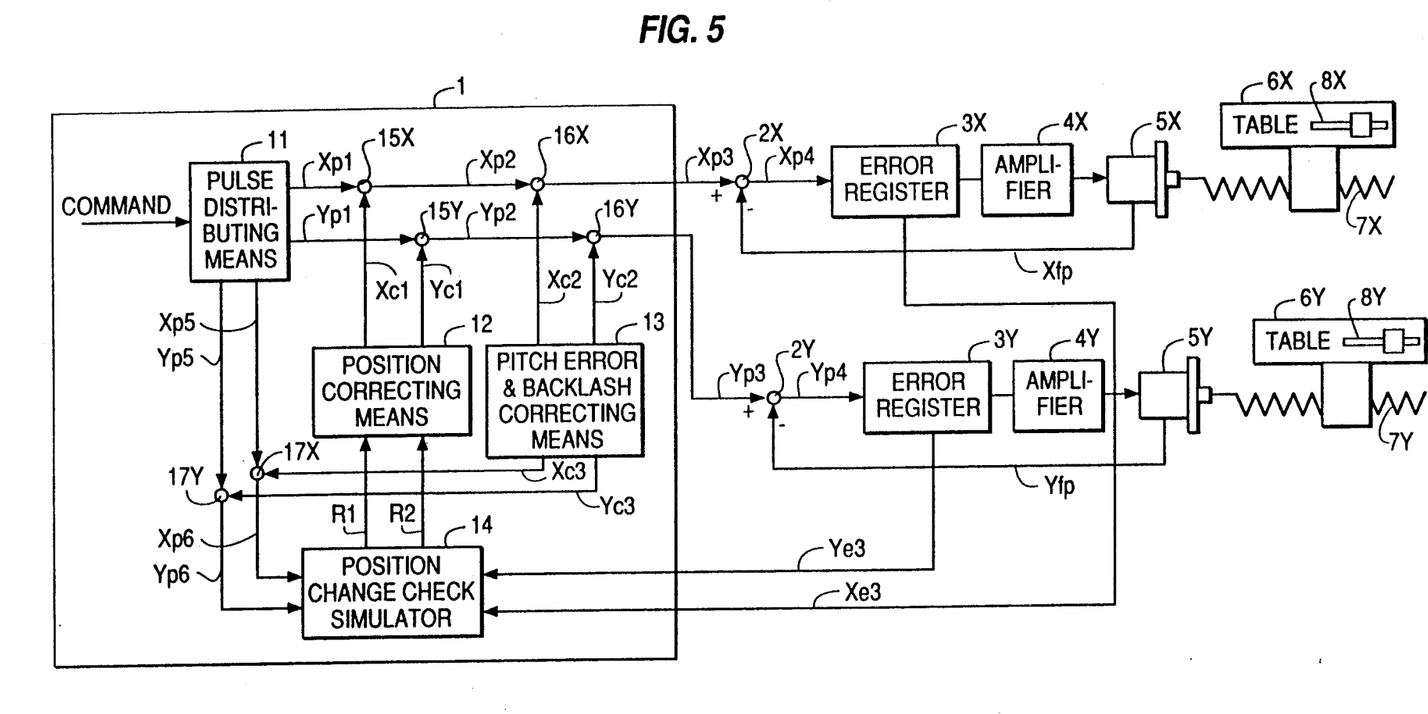

FIG. 5 is a block diagram showing a method of correcting a change of position of a machine according to still another embodiment of the present invention. The present embodiment is different from that of FIG. 1 in that error amounts Xe3 and Ye3 of the error registers 3X and 3Y are input to the position change check simulator 14, instead of the position signals Xe1 and Ye1, and that the position change check simulator 14 calculates the ratio R2 of these error amounts Xe3 to Ye3.

The values of the error registers 3X and 3Y of the respective axes are the values which have not been moved by the distribution pulses. Accordingly, when the machine rigidity is the same at the respective axes, the ratio R1 of the predicted amounts of movement of the respective axes is usually equal to the ratio R2 of the values of the error registers 3X to 3Y. Nevertheless, as an error usually occurs due to the normal differences in machine rigidities, the values of the error registers 3X and 3Y do not become equal to the ratio R1 of the predicted amounts of movement of the respective axes. Accordingly, the correction pulse is added to the distribution pulse of the axis so that the ratio of the values of the error registers 3X to 3Y of the respective axes becomes equal to the ratio R1 of the predicted amounts of movement of the respective axes, and the respective axes are controlled based on this output pulse. Therefore, an abrupt machining error which may occur at the beginning and just before the end of a machining, and during machining of corners of a machined article, can be minimized.

In the above embodiments, the case of a two-axes control has been explained, but even in the case of control with more than two axes, the ratio of the values of error registers of the respective axes may be similarly obtained and correction pulses may be output so that they match the ratio of the distribution pulses of the respective axes.

According to the present invention, as described above, an abrupt machining error caused by the differences in machine rigidities of the control axes can be eliminated.

We claim:

1. A method of correcting a change of position of a machine tool, in a servo system, having at least two control axes, comprising the steps of:
    a) generating a correction pulse based on a ratio of actual amount of movement of respective axes;
    b) adding the correction pulse to a distribution pulse of respective axes; and
    c) outputting a ratio of amounts of movement of the respective axes of the machine tool obtained from output values of position detectors for detecting a position of the machine tool that becomes equal to a ratio of predicted amounts of movement of the respective axes obtained from a machine position predicted on the basis of distribution pulses of the respective axes, the servo system has at least a first order lag.

2. A method of correcting a change of position of a machine according to claim 1, wherein in said step c) the ratio of amounts of movement is obtained from values of error registers of the respective axes.

3. A method of correcting a change of position of a machine according to claim 1, wherein in said step c) the ratio of amounts of movement is obtained from feedback pulses of servomotors of the respective axes.

4. A method of correcting a change of position of a machine according to claim 1, further comprising a step d) of adding a pulse for correcting pitch errors and backlash to the distribution pulse of the respective axes.

* * * * *

UNITED STATES PATENT AND TRADEMARK OFFICE
CERTIFICATE OF CORRECTION

PATENT NO. : 5,210,478
DATED : MAY 11, 1993
INVENTOR(S) : TAKAO SASAKI ET AL.

It is certified that error appears in the above-indentified patent and that said Letters Patent is hereby corrected as shown below:

Col. 3, line 46, "Xel or Yel" should be --Xcl or Ycl--.

Signed and Sealed this

Twenty-fifth Day of January, 1994

Attest:

BRUCE LEHMAN

Attesting Officer

Commissioner of Patents and Trademarks